(12) United States Patent
Rihan et al.

(10) Patent No.: US 10,726,131 B2
(45) Date of Patent: Jul. 28, 2020

(54) SYSTEMS AND METHODS FOR MITIGATION OF PERMANENT DENIAL OF SERVICE ATTACKS

(71) Applicant: Facebook, Inc., Menlo Park, CA (US)

(72) Inventors: Sahil Sunil Rihan, Menlo Park, CA (US); Oded Horovitz, Palo Alto, CA (US); Stephen August Weis, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 195 days.

(21) Appl. No.: 15/358,021

(22) Filed: Nov. 21, 2016

(65) Prior Publication Data

US 2018/0144135 A1    May 24, 2018

(51) Int. Cl.
| | | |
|---|---|---|
| *G06F 11/00* | (2006.01) | |
| *G06F 21/57* | (2013.01) | |
| *H04L 29/06* | (2006.01) | |
| *G06F 12/14* | (2006.01) | |

(52) U.S. Cl.
CPC ........ *G06F 21/572* (2013.01); *H04L 63/1458* (2013.01); *H04L 2463/141* (2013.01)

(58) Field of Classification Search
CPC ............. G06F 21/572; G06F 2221/033; H04L 2463/141; H04L 63/1458
USPC ....................................... 713/2, 176; 726/23
See application file for complete search history.

(56) References Cited

U.S. PATENT DOCUMENTS

| | | | | |
|---|---|---|---|---|
| 2007/0169088 | A1* | 7/2007 | Lambert ............. | G06F 11/0709 717/168 |
| 2011/0258410 | A1* | 10/2011 | Lambert ............. | G06F 11/2284 711/164 |
| 2012/0158890 | A1* | 6/2012 | Jreij .................... | G06F 11/0784 709/217 |
| 2013/0185564 | A1* | 7/2013 | Jaber .................... | G06F 21/572 713/176 |
| 2013/0286895 | A1* | 10/2013 | Mittapalli ............. | H04L 69/324 370/255 |
| 2014/0047224 | A1* | 2/2014 | Ayanam .................. | G06F 8/654 713/1 |
| 2014/0068238 | A1* | 3/2014 | Jaber .................... | G06F 21/575 713/2 |
| 2014/0195711 | A1* | 7/2014 | Bhatia ................. | G06F 13/4221 710/313 |
| 2014/0208133 | A1* | 7/2014 | Gopal ................. | G06F 11/2294 713/310 |
| 2016/0335005 | A1* | 11/2016 | Dasari ................ | G06F 12/0638 |
| 2017/0010884 | A1* | 1/2017 | Liu .......................... | G06F 8/66 |
| 2017/0046151 | A1* | 2/2017 | Hsu ..................... | G06F 9/44505 |
| 2017/0085383 | A1* | 3/2017 | Rao ....................... | G06F 3/0632 |
| 2017/0109235 | A1* | 4/2017 | Hung ................. | G06F 11/1435 |

(Continued)

*Primary Examiner* — Gary S Gracia
(74) *Attorney, Agent, or Firm* — Sheppard Mullin Richter & Hampton LLP

(57) ABSTRACT

Systems, methods, and non-transitory computer-readable media can perform verification of a currently stored BMC firmware on a remote access-enabled server based on a BMC security key. It can be determined that the currently stored BMC firmware cannot be verified based on the BMC security key. A replacement BMC firmware can be received over a network connection based on the determination that the currently stored BMC firmware cannot be verified. The currently stored BMC firmware can be replaced with the replacement BMC firmware.

20 Claims, 7 Drawing Sheets

(56) References Cited

U.S. PATENT DOCUMENTS

2017/0134349 A1* 5/2017 Ahmed ................ H04L 63/061
2017/0134373 A1* 5/2017 Li ...................... H04L 63/0442

* cited by examiner

SYSTEMS AND METHODS FOR MITIGATION OF PERMANENT DENIAL OF SERVICE ATTACKS

FIELD OF THE INVENTION

The present technology relates to the field of computing system security. More particularly, the present technology relates to systems and methods for mitigation of permanent denial of service attacks.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Social networking systems, and other computing service providers, often utilize one or more servers to provide computing services over a network. Larger computing service providers may utilize thousands of servers to provide services to users. When servers go down, or are compromised in some way, services to users may be interrupted. Such service interruptions may lead to dissatisfaction among users whose use or enjoyment of the services are impacted. As such, computing service providers may utilize various security measures to ensure the security and continued operation of their servers.

SUMMARY

Various embodiments of the present disclosure can include systems, methods, and non-transitory computer readable media configured to perform verification of a currently stored BMC firmware on a remote access-enabled server based on a BMC security key. It can be determined that the currently stored BMC firmware cannot be verified based on the BMC security key. A replacement BMC firmware can be received over a network connection based on the determination that the currently stored BMC firmware cannot be verified. The currently stored BMC firmware can be replaced with the replacement BMC firmware.

In an embodiment, the remote access-enabled server comprises a server portion for providing computing resources, and a BMC portion for providing remote access to the remote access-enabled server.

In an embodiment, the performing the verification of the currently stored BMC firmware, the determining that the currently stored BMC firmware cannot be verified, and the receiving the replacement BMC firmware are performed using bootstrap software stored on the BMC portion.

In an embodiment, the bootstrap software is stored on a read-only storage unit of the BMC portion.

In an embodiment, the currently stored BMC firmware is stored on a read-write storage unit of the BMC portion.

In an embodiment, the BMC security key is stored on the read-only storage unit.

In an embodiment, the BMC portion provides for at least one of remote power control, remote serial port access, or remote console access of the remote access-enabled server.

In an embodiment, a replacement BMC firmware is requested over a network connection based on the determination that the currently stored BMC firmware cannot be verified.

In an embodiment, verification is performed of the replacement BMC firmware based on the BMC security key.

In an embodiment, the remote access-enabled server comprises: a server CPU; a BMC CPU in communication with the server CPU; a read-write storage unit in communication with the BMC CPU for storing BMC firmware; and a read-only storage unit in communication with the BMC CPU for storing the BMC security key and bootstrap software configured to perform verification of BMC firmware.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
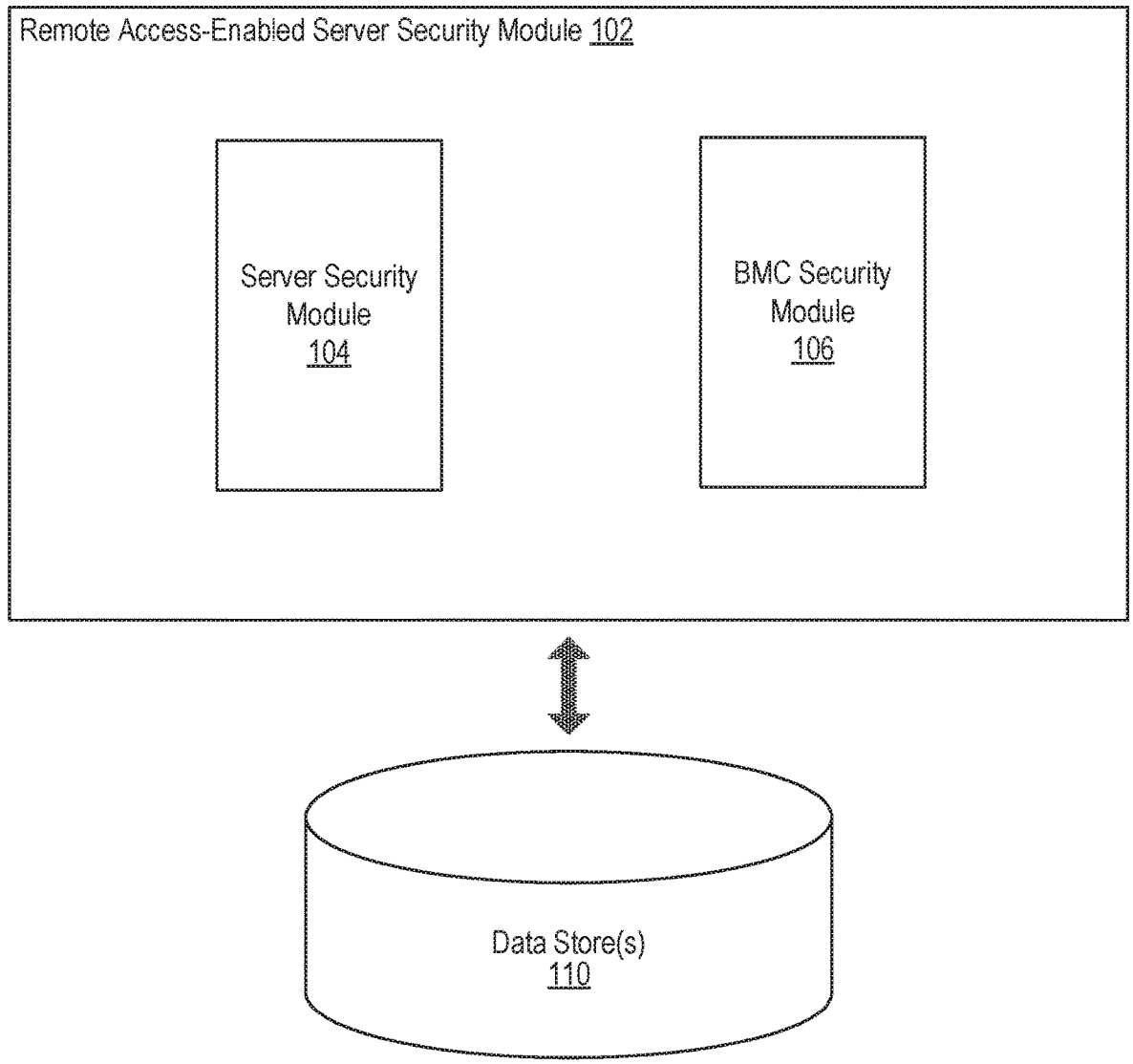
FIG. 1 illustrates an example system including a remote access-enabled server security module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Mitigation of Permanent Denial of Service Attacks

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Social networking systems, and other computing service providers, often utilize one or more servers to provide computing services over a network. Larger computing service providers may utilize thousands of servers to provide services to users. When servers go down, or are compromised in some way, services to users may be interrupted. Such service interruptions may lead to dissatisfaction among users whose use or enjoyment of the services are impacted. As such, computing service providers may utilize various security measures to ensure the security and continued operation of their servers.

It is often the case that servers are stored in a remote location, such as a data center or a data storage facility. In such scenarios, servers may be configured to be controlled remotely. For example, servers can be equipped with hardware and/or software to allow for remote access to and control of each server. As such, when a server becomes corrupted or otherwise disabled, it can be repaired remotely such that a user does not have to go to the physical location of the server to perform repairs or maintenance. However, under conventional approaches, if the hardware and/or software that allows for remote access to the server becomes compromised, the ability to interact with and repair the server remotely may also become compromised. For example, servers may be compromised or interrupted by malicious users seeking to corrupt and/or infiltrate a computing service provider's servers. One class of attacks is known as "permanent denial of service attacks," or PDoS attacks. PDoS attacks can attack a server's remote access capabilities, such that any repairs would have to be performed physically at the server's location, or the server would have be removed from its location and moved to another location for repair. While this may be a minor annoyance for a handful of servers, it can be appreciated that if hundreds or thousands (or more) of servers are impacted in this way, the resources required to physically repair each server can be enormous.

An improved approach rooted in computer technology overcomes the foregoing and other disadvantages associated with conventional approaches specifically arising in the realm of computer technology. In general, a remote access-enabled server can comprise a server portion and a remote access portion. The remote access portion can be configured to provide remote access to and/or control of the server. In certain embodiments, the remote access portion can be implemented using a baseboard management controller (BMC). The remote access portion will also be referred to as a BMC portion. However, it should be understood that the BMC portion can be implemented using a variety of configurations, including configurations with or without a BMC. In various embodiments, the BMC portion can include a read-only storage unit, and a read-write storage unit. The read-write storage unit can include BMC firmware configured to provide remote access capabilities. The read-only storage unit can include bootstrap software and a security key for verifying the BMC firmware stored in the read-write storage unit. When the server is powered on and/or boots up, the bootstrap software can perform verification of the BMC firmware stored on the read-write storage unit. If the BMC firmware is verified and/or determined to be trustworthy (e.g., by determining that a digital signature can be verified based on the security key), the server can resume booting up using the BMC firmware. However, if the BMC firmware cannot be verified (e.g., by determining that the digital signature cannot be verified based on the security key), then start-up of the server is canceled or paused, and the bootstrap software is configured to wait for new BMC firmware. For example, the bootstrap software can be configured to pause boot up of the server, and to wait for new BMC firmware to be provided over a network (e.g., from a remote workstation or server). In another embodiment, the bootstrap software can be configured to request new BMC firmware over the network. Once new BMC firmware is received, verification of the new BMC firmware can be performed based on the security key (e.g., by evaluating a digital signature associated with the new BMC firmware using the security key). If the new BMC firmware also cannot be verified, the bootstrap software can be configured to wait for another new BMC firmware. However, if the new BMC firmware is determined to be trustworthy, it can be saved to the read-write storage unit, and the server can continue start-up operations using the new BMC firmware. In certain embodiments, the new BMC firmware can be written to the read-write storage unit before or after verification of the new BMC firmware is performed. More details regarding the present technology are described herein.

FIG. 1 illustrates an example system 100 including an example remote access-enabled server security module 102, according to an embodiment of the present disclosure. The remote access-enabled server security module 102 can be configured to provide security measures for a remote access-enabled server. In certain embodiments, the remote access-enabled server can include a server portion and a remote access portion. In certain embodiments, the remote access portion is implemented using a baseboard management controller (BMC). As such, the remote access portion will also be referred to herein as a "BMC portion." However, it should be understood that in certain embodiments, the BMC portion does not necessarily have to be implemented using a baseboard management controller.

The server portion can be configured to provide various computing resources and functions. For example, the server portion can be configured to provide data storage, data management, data processing, and the like. The computing capabilities of one or more server portions of one or more servers can be utilized by computing service providers to provide computing services to various users.

The BMC portion can be configured to provide remote access to and/or control of the server. For example, the BMC portion may allow a user at a workstation or computing device to power the server on or off, restart the server, monitor the status of the server, provide updates to the server, repair problems at the server, and the like, over a network connection.

As briefly introduced above, and as will be described in greater detail below, the remote access-enabled server security module 102 can be configured to provide security measures for a remote access-enabled server. These security measures can include bootstrap software on the BMC portion for performing verification of BMC firmware stored on the BMC portion. In various embodiments, when the remote access-enabled server is powered on and/or booted up, the BMC portion can first load the bootstrap software to perform verification of a currently stored BMC firmware. In some instances, the currently stored BMC firmware will not be verified when it is corrupted, comprised, or otherwise faulty in some way. If the BMC firmware is verified, then the BMC firmware can be run and the server can begin normal operations. However, if the BMC firmware cannot be verified, the BMC portion can be configured to receive updated BMC firmware over a network connection to replace the currently stored corrupted or faulty BMC firmware.

As shown in the example of FIG. 1, the remote access-enabled server security module 102 can include a server security module 104 and a BMC security module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the remote access-enabled server security module 102 can be implemented in any suitable combinations.

In some embodiments, the remote access-enabled server security module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the remote access-enabled server security module 102 can be implemented, in part or in whole, as software running on one or more computing devices or systems, such as on a user or client computing device. For example, the remote access-enabled server security module 102, or at least a portion thereof, can be implemented as or within an application (e.g., app), a program, or an applet, etc., running on a user computing device or a client computing system, such as the user device 610 of FIG. 6. In another example, the remote access-enabled server security module 102, or at least a portion thereof, can be implemented using one or more computing devices or systems that include one or more servers, such as network servers or cloud servers. In some instances, the remote access-enabled server security module 102 can, in part or in whole, be implemented within or configured to operate in conjunction with a social networking system (or service), such as the social networking system 630 of FIG. 6. It should be understood that there can be many variations or other possibilities.

The remote access-enabled server security module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the remote access-enabled server security module 102. For example, the data store 110 can store replacement BMC firmware information, replacement server BIOS information, firmware version information, hash value information, historical hash values, and the like. It is contemplated that there can be many variations or other possibilities.

The server security module 104 can be configured to provide security measures for a server portion of a remote access-enabled server. In certain embodiments, these security measures can include establishing a chain of trust between various components in the server portion. These components can include a server CPU, a server BIOS, server firmware, and/or a server kernel, to name a few components. For example, this chain of trust can be implemented using a server key physically burned into the server CPU. The server key can be used to compute a hash value for each of the other components (e.g., the server BIOS, server firmware, server kernel). The computed hash values can be stored in a Trust Platform Module (TPM), and compared against a whitelist of known, trusted hash values to ensure that each of the components are trusted components. Since the server key is hard-wired into the server CPU, it cannot be hacked into or changed without physically replacing or altering the CPU. The hard-wired key can be used to check the trustworthiness of other components, including software components such as the BIOS, firmware, and kernel.

The BMC security module 106 can be configured to provide security measures for a BMC portion of a remote access-enabled server. The BMC portion of a remote access-enabled server can include a BMC CPU, and one or more storage units. The term "BMC CPU" is used to reference a CPU associated with the BMC portion. As discussed above, the BMC portion does not necessarily have to be implemented using a baseboard management controller. As such, the BMC CPU may be any CPU associated with the BMC portion, and does not have be a CPU implemented on a baseboard management controller. In certain embodiments, the BMC CPU can be an ARM processor. The one or more storage units can store BMC firmware configured to provide remote access capabilities to the remote access-enabled server. The remote access capabilities can include, for example, remote power control, remote serial port access, remote console access, and the like. Even when a server is powered off, power can be provided to the BMC portion to ensure that remote access capabilities are always available. In certain embodiments, remote access capabilities may be implemented using the intelligent platform management interface (IPMI) protocol. Since the BMC portion is able to control the server (including the server portion), any software run by the BMC portion must be checked and verified for reliability and trustworthiness. Furthermore, while security of the server portion is important, if server portion software becomes corrupted, it can generally be reset/repaired remotely via the remote access capabilities provided by the BMC portion. However, if the BMC portion becomes corrupted, remote access capabilities may no longer be available, and a technician would have to physically go to and repair the server on site, or the server would have to be physically pulled for repairs.

In various embodiments, the BMC security module 106 can provide security measures to protect the BMC portion using bootstrap software configured to perform verification of BMC firmware currently stored on the BMC portion. In certain embodiments, the BMC portion can include at least two storage units: a read-only storage unit, and a read-write storage unit. In certain embodiments, one or both of the storage units can be flash storage. The bootstrap software and a BMC security key can be stored on the read-only storage unit, while BMC firmware can be stored on the read-write storage unit. By placing the bootstrap software and the BMC security key on the read-only storage unit, it is ensured that these components cannot be modified in any way. By placing the BMC firmware on the read-write storage unit, the BMC firmware can be updated as new versions become available, and can also be replaced and/or repaired if the BMC firmware ever becomes compromised or damaged. The BMC security module 106 will be described in greater detail herein.

Figure 2:
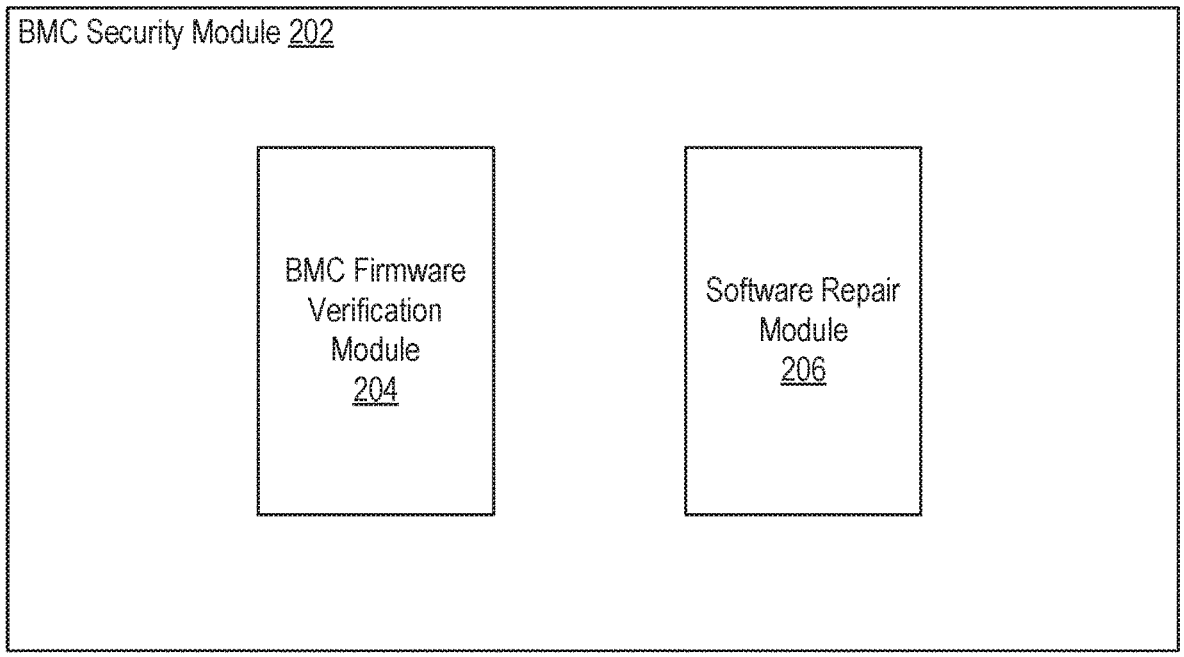
FIG. 2 illustrates an example BMC security module, according to various embodiments of the present disclosure.

FIG. 2 illustrates an example BMC security module 202 configured to provide security measures for a BMC portion of a remote access-enabled server, according to an embodiment of the present disclosure. In some embodiments, the BMC security module 106 of FIG. 1 can be implemented as the BMC security module 202. As shown in the example of FIG. 2, the BMC security module 202 can include a BMC firmware verification module 204 and a software repair module 206.

The BMC firmware verification module 204 can be configured to perform verification of BMC firmware stored on the BMC portion. As discussed above, the BMC portion can include a BMC security key that can be used to evaluate the trustworthiness of BMC firmware. For example, the BMC security key can be used to calculate and verify a hash value associated with the BMC firmware, and/or verify a digital signature associated with the BMC firmware. As stated above, the BMC security key can be stored on a read-only storage unit so that it cannot be tampered with or corrupted.

The software repair module 206 can be configured to repair various software components in a remote access-enabled server. For example, the software repair module 206 can be configured to repair BMC firmware if the BMC firmware verification module 204 determines that currently stored BMC firmware is not trustworthy (i.e., cannot be verified). The software repair module 206 can also be configured to repair server portion software components, such as the server BIOS, firmware, and/or kernel. The software repair module 206 is described in greater detail herein with reference to FIG. 3.

Figure 3:
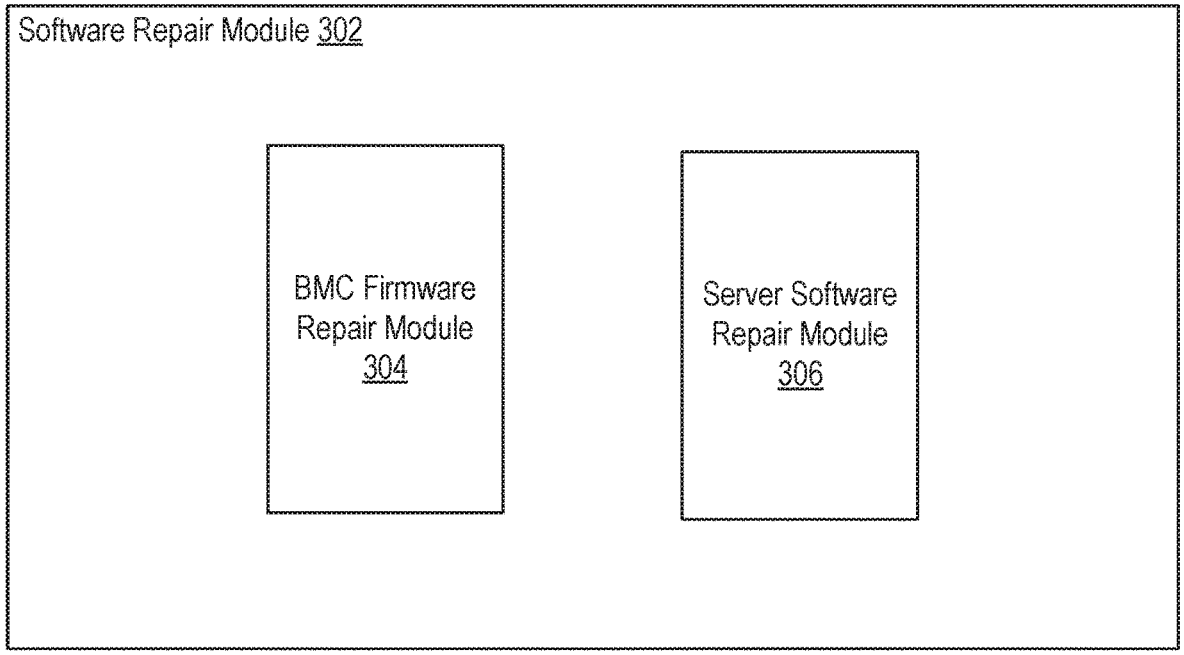
FIG. 3 illustrates an example software repair module, according to various embodiments of the present disclosure.

FIG. 3 illustrates an example software repair module 302 configured to repair software of a remote access-enabled server, according to an embodiment of the present disclosure. In some embodiments, the software repair module 206 of FIG. 2 can be implemented as the software repair module 302. As shown in the example of FIG. 3, the software repair module 302 can include a BMC firmware repair module 304 and a server software repair module 306.

The BMC firmware repair module 304 can be configured to repair BMC firmware. For example, if the BMC firmware verification module 204 determines that currently stored BMC firmware cannot be verified (e.g., because it is corrupted or damaged), then the BMC firmware repair module 304 can be configured to receive new BMC firmware over a network connection. The BMC firmware repair module 304 can be configured to affirmatively request new BMC firmware over the network connection, such that a remote workstation is notified that new BMC firmware must be transmitted to the remote access-enabled server. Alternatively, the BMC firmware repair module 304 can be configured to suspend operations of the remote access-enabled server and wait for new BMC firmware to be pushed to the remote access-enabled server. In this embodiment, a remote workstation or a user at a remote workstation could notice that the remote access-enabled server is not in operation, and could query the remote access-enabled server to see why it is not in operation. The remote access-enabled server's operating status could indicate that new BMC firmware is required, and new BMC firmware could be pushed to the remote access-enabled server. Once new BMC firmware is received over the network connection, the BMC firmware repair module 304 can be configured to replace the currently stored BMC firmware with the new BMC firmware on the BMC portion (e.g., on a read-write storage unit of the BMC portion). The new BMC firmware could then be checked for reliability/trustworthiness (e.g., by BMC firmware verification module 204 of FIG. 2), as described above. In various embodiments, the new BMC firmware can be verified before storing it on the read-write storage unit, or after it has been stored on the read-write storage unit.

By providing new BMC firmware over a network connection, rather than storing an older version of BMC firmware or a "golden image" on the BMC portion, the present disclosure allows for updated and/or relatively new BMC firmware to be provided to the BMC portion. This provides additional security benefits, such as protecting against a class of attacks known as "downgrade attacks," which corrupt current software with the knowledge that an older version of the corrupted software will be installed, so as to take advantage of known vulnerabilities in the older version of the software. In certain embodiments, the BMC portion can include its own TPM for storing information about the last trusted version of BMC firmware. In certain embodiments, the BMC firmware repair module 304 can be configured to refuse older versions of BMC firmware with known vulnerabilities.

The server software repair module 306 can be configured to repair various software components associated with a server portion of a remote access-enabled server. For example, the server software repair module 306 can be configured to repair a server portion BIOS, firmware, and/or kernel. In certain embodiments, at least some of the functions of the server software repair module 306 can be stored on and/or performed by the BMC portion. In this way, if a software component of the server portion becomes corrupted or damaged, the BMC portion can repair the damaged software component. For example, if the server portion BIOS becomes damaged, the BMC portion can include a golden image of the server portion BIOS such that the golden image can be used to flash a new BIOS onto the server portion. Or in another example, the BMC portion can be configured to receive a new server portion BIOS over a network connection to repair the damaged server portion BIOS.

Figure 4:
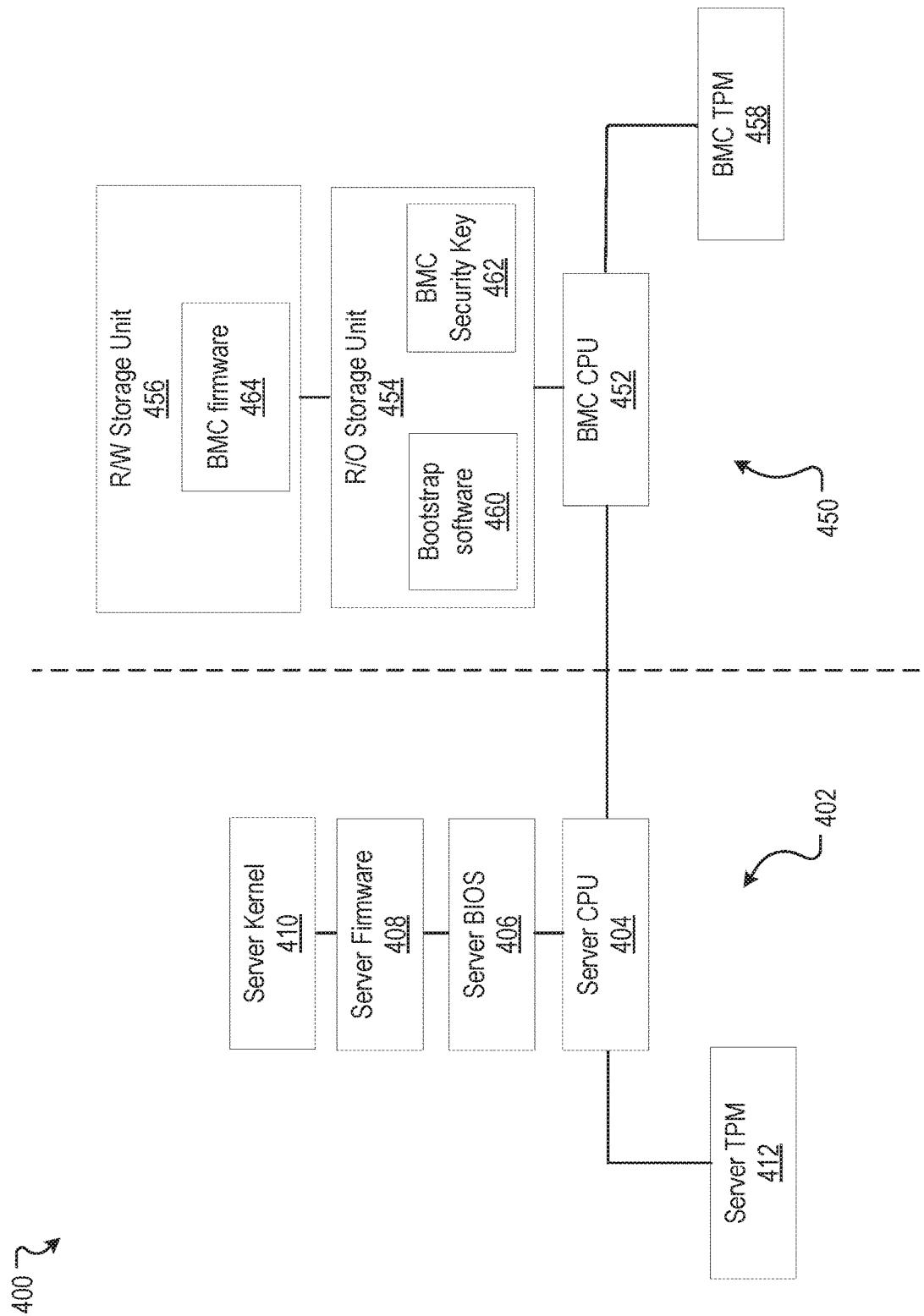
FIG. 4 illustrates an example scenario associated with providing security measures for a remote access-enabled server, according to an embodiment of the present disclosure.

FIG. 4 illustrates an example scenario 400 associated with providing security measures for a remote access-enabled server, according to an embodiment of the present disclosure. The example scenario 400 is a block diagram representation of a remote access-enabled server, and includes a server portion 402 and a BMC portion 450. The server portion 402 can be configured to carry out various computing functions, while the BMC portion 450 can be configured to provide remote access to the server portion 402. In certain embodiments, both the server portion 402 and the BMC portion 450 can be housed in a single server housing.

The server portion 402 can include a server CPU 404, along with various software components, such as a server BIOS 406, server firmware 408, and a server kernel 410. The server portion 402 can also include a server TPM 412 that is used in verifying the various software components of the server portion 402. For example, the server CPU 404 can include a hard-coded security key that is used to compute hash values for the various server portion software components, e.g., the server BIOS 406, the server firmware 408, and the server kernel 410. The computed hash values can be stored in the server TPM 412, and compared to known, trusted hash values, to ensure that the server portion software components are trustworthy and have not been corrupted or damaged.

The BMC portion 450 can include a BMC CPU 452, as well as one or more storage units. In the example scenario 400, the BMC portion 450 includes a read-only storage unit 454 and a read-write storage unit 456. The read-only storage unit 454 stores bootstrap software 460, and BMC security key 462, while the read-write storage unit 456 stores BMC firmware 464. When the remote access-enabled server boots up, the boot up procedure can begin by loading the bootstrap software 460 on the read-only storage unit 454. The bootstrap software 460 can be configured to perform verification of the BMC firmware 464 using the BMC security key 462. For example, a digital signature associated with the BMC firmware 464 can be verified using the BMC security key 464. In another example, a hash value can be computed for the BMC firmware 464 using the BMC security key 462, and compared to known, trusted hash values. If the BMC firmware 464 is verified, then the BMC firmware can be loaded and the server can resume boot up procedures and normal operation. However, if the BMC firmware 464 cannot be verified, then the bootstrap software 460 can be configured to receive new BMC firmware over a network connection to replace the currently stored BMC firmware 464. The bootstrap software 460 can be configured to affirmatively request and receive new BMC firmware over the network connection, or it can be configured to pause operation of the remote access-enabled server and wait for new BMC firmware to be provided. Once new BMC firmware is received, the bootstrap software 460 can be configured to replace the currently stored BMC firmware 464 with the newly received BMC firmware, and BMC firmware verification can begin again using the new BMC firmware. A BMC TPM 458 can be used to store information associated with BMC firmware verification. For example, hash values and a white list of trusted hash values can be stored in the BMC TPM. In certain embodiments, the BMC TPM 458 can store a log of known, trusted versions of BMC firmware. In certain embodiments, the bootstrap software 460 can be configured to reject older versions of BMC firmware based on information stored in the BMC TPM 458. In certain embodiments, the BMC TPM 458 can store hashes of any settings or configurations associated with the BMC firmware, such as BMC firmware configuration information that is stored separately on the read-write storage unit 456. This can allow such configuration information to be updated without having to update the entire BMC firmware image.

Figure 5:
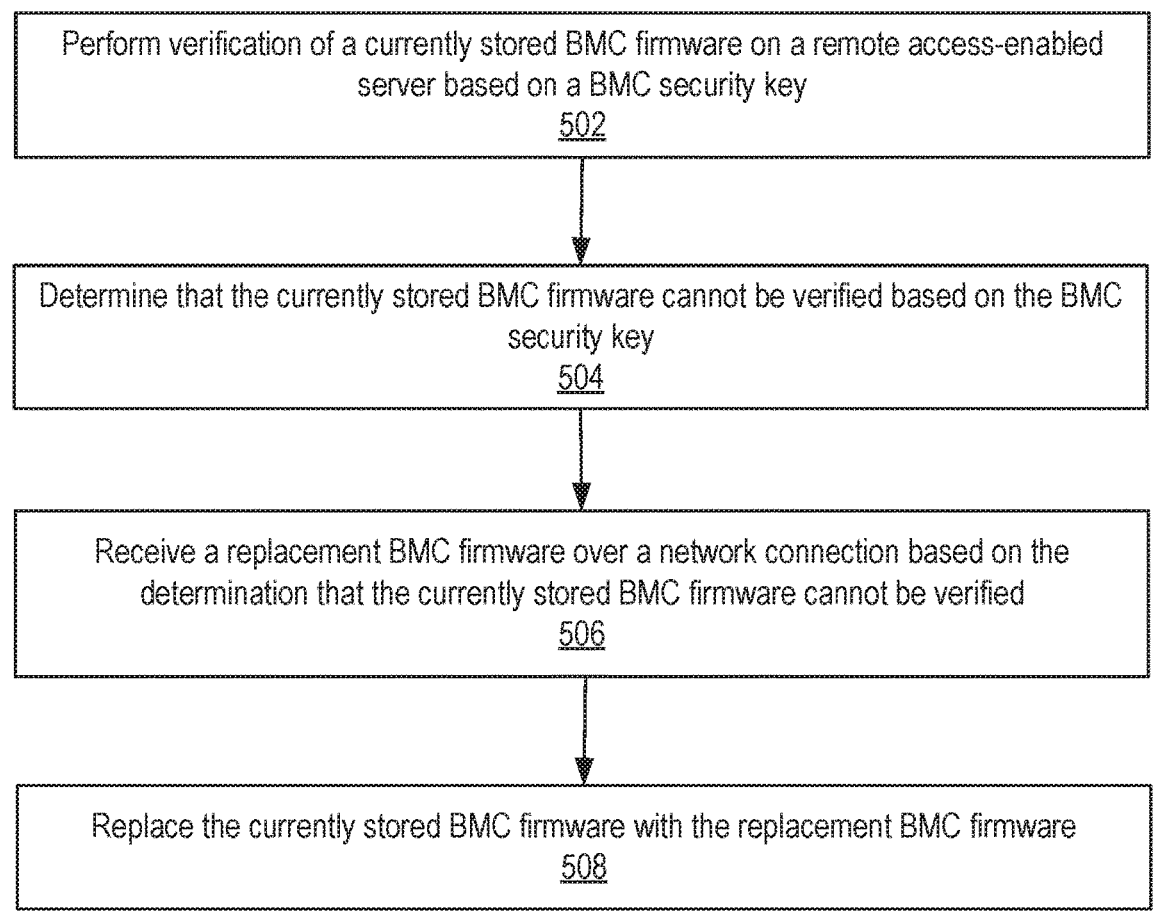
FIG. 5 illustrates an example method associated with providing security measures for a remote access-enabled server, according to an embodiment of the present disclosure.

FIG. 5 illustrates an example method 500 associated with providing security measures for a remote access-enabled server, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can perform verification of a currently stored BMC firmware on a remote access-enabled server based on a BMC security key. At block 504, the example method 500 can determine that the currently stored BMC firmware cannot be verified based on the BMC security key. At block 506, the example method 500 can receive a replacement BMC firmware over a network connection based on the determination that the currently stored BMC firmware cannot be verified. At block 508, the example method 500 can replace the currently stored BMC firmware with the replacement BMC firmware.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
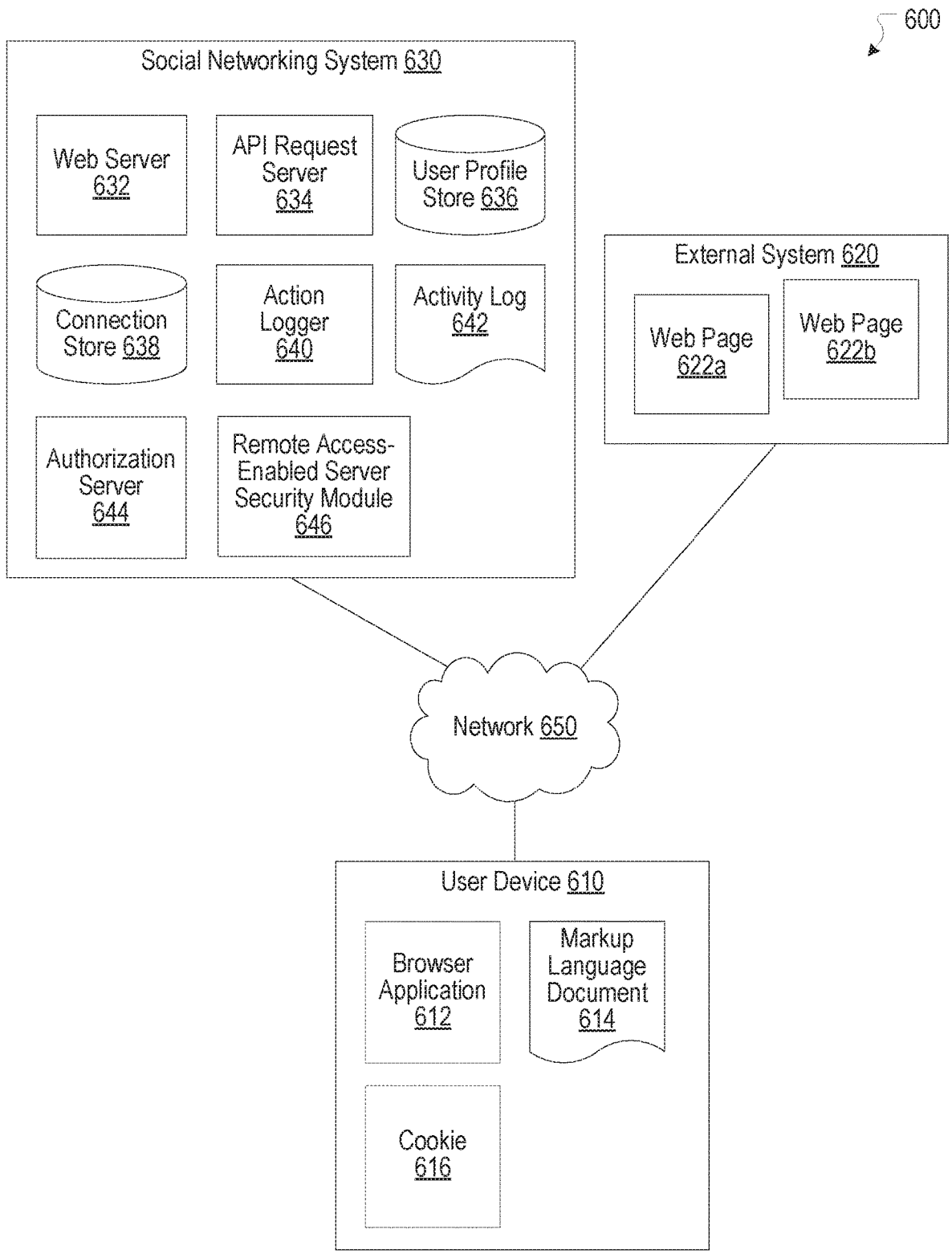
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML).

In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a remote access-enabled server security module 646. The remote access-enabled server security module 646 can, for example, be implemented as the remote access-enabled server security module 102, as discussed in more detail herein. As discussed previously, it should be appreciated that there can be many variations or other possibilities. For example, in some embodiments, one or more functionalities of the remote access-enabled server security module 646 can be implemented in the user device 610.

Hardware Implementation

Figure 7:
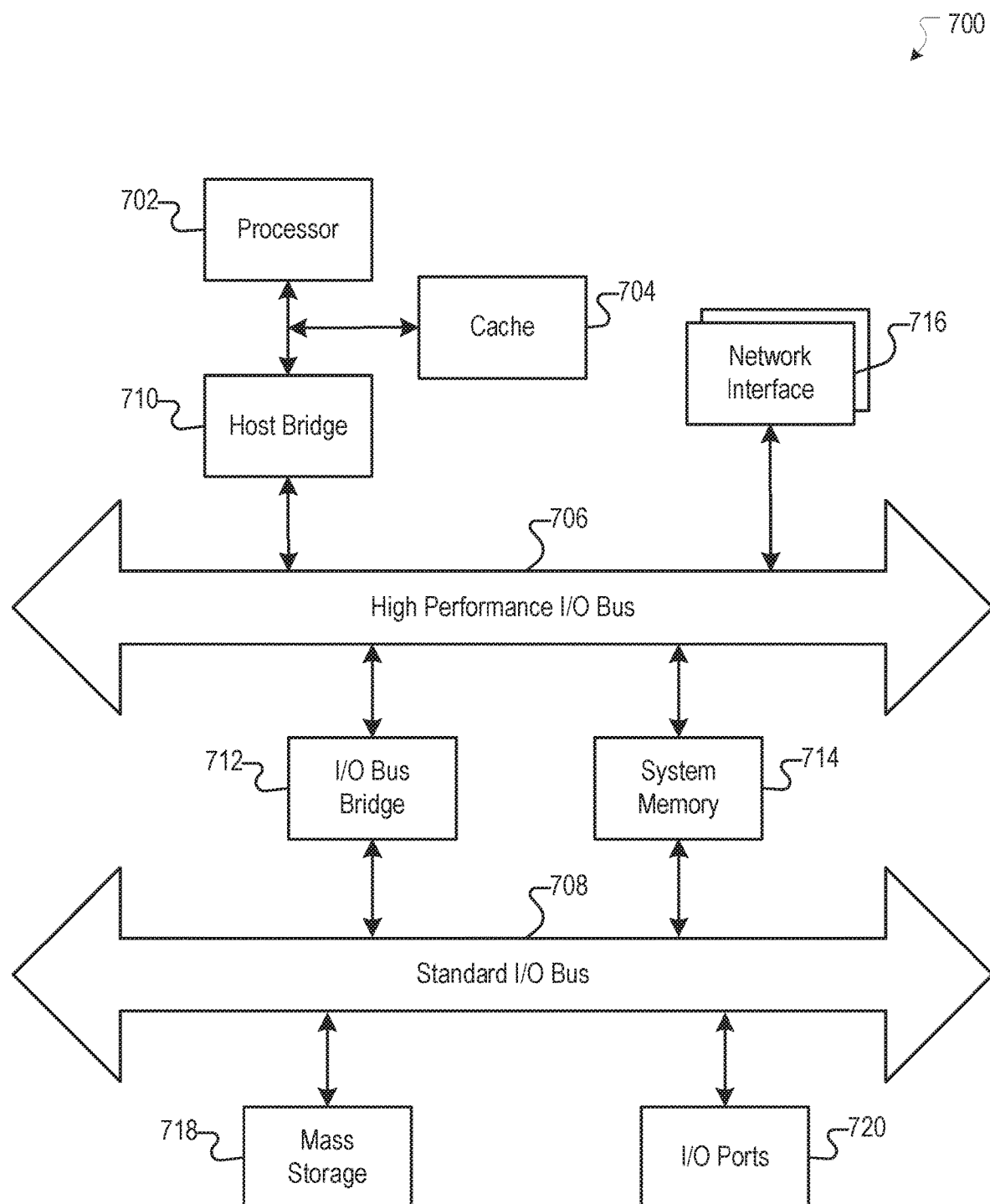
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
performing, by a computing system, verification of a currently stored BMC firmware on a remote access-enabled server based on a BMC security key, wherein the remote access-enabled server comprises a server portion for providing computing resources and a BMC portion for providing remote access to the remote access-enabled server, wherein bootstrap software is stored on a read-only storage unit of the BMC portion;
determining, by the computing system, that the currently stored BMC firmware cannot be verified based on the BMC security key;
requesting, by the computing system, a replacement BMC firmware over a network connection based on the determination that the currently stored BMC firmware cannot be verified, wherein the requesting is performed using the bootstrap software stored on the BMC portion;
receiving, by the computing system, the replacement BMC firmware over the network connection; and
replacing, by the computing system, the currently stored BMC firmware with the replacement BMC firmware.

2. The computer-implemented method of claim 1, wherein the performing the verification of the currently stored BMC firmware, the determining that the currently stored BMC firmware cannot be verified, and the receiving the replacement BMC firmware are performed using the bootstrap software stored on the BMC portion.

3. The computer-implemented method of claim 1, wherein the currently stored BMC firmware is stored on a read-write storage unit of the BMC portion.

4. The computer-implemented method of claim 1, wherein the BMC security key is stored on the read-only storage unit.

5. The computer-implemented method of claim 1, wherein the BMC portion provides for at least one of remote power control, remote serial port access, or remote console access of the remote access-enabled server.

6. The computer-implemented method of claim 1, further comprising:
performing verification of the replacement BMC firmware based on the BMC security key.

7. The computer-implemented method of claim 1, wherein the remote access-enabled server comprises:
a server CPU;
a BMC CPU in communication with the server CPU;
a read-write storage unit in communication with the BMC CPU for storing BMC firmware; and
a read-only storage unit in communication with the BMC CPU for storing the BMC security key and the bootstrap software configured to perform verification of BMC firmware.

8. A system comprising:
at least one processor; and
a memory storing instructions that, when executed by the at least one processor, cause the system to perform a method comprising:
performing verification of a currently stored BMC firmware on a remote access-enabled server based on a BMC security key, wherein the remote access-enabled server comprises a server portion for providing computing resources and a BMC portion for providing remote access to the remote access-enabled server, wherein bootstrap software is stored on a read-only storage unit of the BMC portion;
determining that the currently stored BMC firmware cannot be verified based on the BMC security key;

requesting a replacement BMC firmware over a network connection based on the determination that the currently stored BMC firmware cannot be verified, wherein the requesting is performed using the bootstrap software stored on the BMC portion;

receiving the replacement BMC firmware over the network connection; and replacing the currently stored BMC firmware with the replacement BMC firmware.

9. The system of claim 8, wherein the performing the verification of the currently stored BMC firmware, the determining that the currently stored BMC firmware cannot be verified, and the receiving the replacement BMC firmware are performed using the bootstrap software stored on the BMC portion.

10. The system of claim 8, wherein the currently stored BMC firmware is stored on a read-write storage unit of the BMC portion.

11. The system of claim 8, wherein the BMC security key is stored on the read-only storage unit.

12. The system of claim 8, wherein the BMC portion provides for at least one of remote power control, remote serial port access, or remote console access of the remote access-enabled server.

13. The system of claim 8, wherein the instructions cause the system to perform the method further comprising:

performing verification of the replacement BMC firmware based on the BMC security key.

14. The system of claim 8, wherein the remote access-enabled server comprises:

a server CPU;

a BMC CPU in communication with the server CPU;

a read-write storage unit in communication with the BMC CPU for storing BMC firmware; and a read-only storage unit in communication with the BMC CPU for storing the BMC security key and the bootstrap software configured to perform verification of BMC firmware.

15. A non-transitory computer-readable storage medium including instructions that, when executed by at least one processor of a computing system, cause the computing system to perform a method comprising:

performing verification of a currently stored BMC firmware on a remote access-enabled server based on a BMC security key, wherein the remote access-enabled server comprises a server portion for providing computing resources and a BMC portion for providing remote access to the remote access-enabled server, wherein bootstrap software is stored on a read-only storage unit of the BMC portion;

determining that the currently stored BMC firmware cannot be verified based on the BMC security key;

requesting a replacement BMC firmware over a network connection based on the determination that the currently stored BMC firmware cannot be verified, wherein the requesting is performed using the bootstrap software stored on the BMC portion;

receiving the replacement BMC firmware over the network connection; and replacing the currently stored BMC firmware with the replacement BMC firmware.

16. The non-transitory computer-readable storage medium of claim 15, wherein the performing the verification of the currently stored BMC firmware, the determining that the currently stored BMC firmware cannot be verified, and the receiving the replacement BMC firmware are performed using the bootstrap software stored on the BMC portion.

17. The non-transitory computer-readable storage medium of claim 15, wherein the currently stored BMC firmware is stored on a read-write storage unit of the BMC portion.

18. The non-transitory computer-readable storage medium of claim 15, wherein the BMC security key is stored on the read-only storage unit.

19. The non-transitory computer-readable storage medium of claim 15, wherein the BMC portion provides for at least one of remote power control, remote serial port access, or remote console access of the remote access-enabled server.

20. The non-transitory computer-readable storage medium of claim 15, wherein the instructions cause the computing system to perform the method further comprising:

performing verification of the replacement BMC firmware based on the BMC security key.

* * * * *